United States Patent Office.

FRANK P. HARNED, OF CAMDEN, NEW JERSEY.

PROCESS OF MAKING NEUTRAL ALUMINOUS COMPOUNDS.

SPECIFICATION forming part of Letters Patent No. 342,599, dated May 25, 1886.

Application filed January 4, 1886. Serial No. 187,573. (No specimens.)

*To all whom it may concern:*

Be it known that I, FRANK P. HARNED, of the city and county of Camden, in the State of New Jersey, have invented certain new and useful Improvements in the Manufacture of Sulphate of Alumina or Aluminous Cake, of which the following is a specification.

In the use of sulphate of alumina or aluminous cake in the arts it is desirable for some purposes to have a neutral and in others a basic salt, and it is essential that the product should be regular or uniform.

In all the processes as heretofore practiced for the manufacture of sulphate of alumina (with but probably one exception, in which the pure hydrate of alumina is obtained first, and this, however, is very expensive) the products have invariably been very irregular and unsatisfactory, due to the fact that the ratio or proportion of acid to alumina has varied materially—that is to say, there has been a large excess of acid present, which has greatly deteriorated the finished product; and with aluminous cake or sizing compounds that have been composed principally of sulphate of alumina or sulphates of alumina and zinc the excess of acid absolutely necessary for the decomposition of the clay or material has also greatly deteriorated the value of the product, and to avoid this has formed the subject matter of several patents, wherein oxide of zinc or carborate of zinc or carbonate of magnesia, or other suitable neutralizing materials have been added to a more or less dilute solution of the sulphate of alumina, and then, after the desired point of basisity had been reached, the liquor was conducted into suitable vessels for its evaporation. It is, however, a well-established fact in chemistry that a neutral or basic solution of sulphate of alumina cannot be evaporated without the decomposition of a part of the mass, forming an insoluble precipitation of basic sulphate of alumina, destroying the sizing properties of the alumina sulphates so decomposed, setting free the acid, and giving a quantity of insoluble material in the finished product; and to overcome these serious and objectionable results heretofore experienced is the object of my invention, and to produce a regular or uniform sulphate of alumina or aluminous cake which will be either neutral or basic, as may be desired for the particular use or application of the finished product to the arts.

My invention consists in adding to the sulphate of alumina or aluminous cake, after the acid has thoroughly combined with the alumina, and the mass has been evaporated to the desired degree of strength—say 65° Baumé, more or less—a small quantity of one of the alkalies or alkaline salts, preferably pulverized caustic soda or aluminate of soda—that is to say, adding to the sulphate of alumina such a quantity of the alkali or alkaline salt as will neutralize the free acid in case a neutral salt is required, or in case a basic salt is demanded such a quantity of caustic soda or aluminate of soda or other suitable alkali or alkaline salt as will sufficiently neutralize the acid and leave the product with the desired rate or proportion of acid to alumina.

The exact quantity of caustic soda or aluminate of soda or other suitable alkali or alkaline salt required for the neutralization of the decomposed mass can in each case be readily ascertained by making a test of the aluminous cake after the alumina and acid have combined and the mass has been evaporated to the desred degree of strength, and, by preference, the alkali or alkaline salt is added during the grinding of the product by mechanically mixing it therewith.

Having thus described the nature and objects of my invention, what I claim as new, and desire to secure by Letters Patent, is—

The improvement in the process of manufacturing sulphate of alumina or aluminous cake, which consists in mechanically mixing pulverized caustic soda or aluminate of soda therewith during the grinding of the product for neutralizing the free acid therein, substantially as and for the purpose set forth..

FRANK P. HARNED.

Witnesses:
CLARENCE G. JAMES,
J. WALTER DOUGLASS.